US011256217B2

(12) United States Patent
Tortora

(10) Patent No.: US 11,256,217 B2
(45) Date of Patent: Feb. 22, 2022

(54) WATCH INCLUDING A DEVICE FOR MEASURING THE DEGREE OF RELATIVE HUMIDITY INSIDE THE WATCH CASE

(71) Applicant: The Swatch Group Research and Development Ltd, Marin (CH)

(72) Inventor: Pierpasquale Tortora, Neuchatel (CH)

(73) Assignee: The Swatch Group Research and Development Ltd, Marin (CH)

( * ) Notice: Subject to any disclaimer, the term of this patent is extended or adjusted under 35 U.S.C. 154(b) by 420 days.

(21) Appl. No.: 16/454,163

(22) Filed: Jun. 27, 2019

(65) Prior Publication Data

US 2020/0026243 A1    Jan. 23, 2020

(30) Foreign Application Priority Data

Jul. 20, 2018    (EP) .................................... 18184764

(51) Int. Cl.
*G04D 7/00*     (2006.01)
*G04B 47/06*    (2006.01)
*G01D 5/353*    (2006.01)
*G04B 37/08*    (2006.01)

(52) U.S. Cl.
CPC ......... *G04D 7/004* (2013.01); *G01D 5/35332* (2013.01); *G04B 37/08* (2013.01); *G04B 47/06* (2013.01)

(58) Field of Classification Search
CPC ........ G04D 7/004; G04B 37/08; G04B 47/06; G01F 5/35332
See application file for complete search history.

(56) References Cited

U.S. PATENT DOCUMENTS

| 3,998,043 A | * | 12/1976 | Tamaru | .................. | G04C 10/04 368/66 |
| 6,795,376 B2 | * | 9/2004 | Quine | ..................... | G04F 1/005 340/309.4 |
| 7,600,430 B2 | * | 10/2009 | Palin | .................... | G04B 47/066 73/700 |

FOREIGN PATENT DOCUMENTS

| CH | 328 663 | 3/1958 |
| CH | 708 942 A2 | 6/2015 |
| CN | 201237701 Y | 5/2009 |
| CN | 101614661 A | 12/2009 |
| CN | 203191704 U | 9/2013 |

OTHER PUBLICATIONS

European Search Report dated Jan. 29, 2019 in European Application 18184764.1, filed on Jul. 20, 2018 (with English Translation of Categories of Cited Documents).
Combined Chinese Office Action and Search Report dated Oct. 29, 2020 in corresponding Chinese Patent Application No. 201910650366.6 (with English Translation and English Translation of Category of Cited Documents), 17 pages.

* cited by examiner

*Primary Examiner* — Sean Kayes
(74) *Attorney, Agent, or Firm* — Oblon, McClelland, Maier & Neustadt, L.L.P.

(57) ABSTRACT

A watch including a watch case, wherein the watch case includes a device for measuring the degree of humidity inside the watch, wherein the device for measuring the degree of humidity is a fibre optic device including a measuring optical fibre, the measuring optical fibre includes a portion configured such that the refractive index of said portion changes in the presence of water vapour inside the watch case.

21 Claims, 1 Drawing Sheet

WATCH INCLUDING A DEVICE FOR MEASURING THE DEGREE OF RELATIVE HUMIDITY INSIDE THE WATCH CASE

CROSS-REFERENCE TO RELATED APPLICATION

This application claims priority to European Patent Application No. 18184764.1 filed on Jul. 20, 2018, the entire disclosure of which is hereby incorporated herein by reference.

FIELD OF THE INVENTION

The invention concerns a watch including a watch case, wherein the watch case includes a device for measuring the degree of relative humidity inside the watch.

The invention also concerns an assembly for measuring the degree of relative humidity inside the watch, including a light emitting and receiving device and the watch.

BACKGROUND OF THE INVENTION

The water resistance of a watch is measured in bars (the bar is a unit of pressure; 1 bar is equivalent to 1 atmosphere or atm). The degree of water resistance of a watch is often indicated in meters (m). Watches marked as water resistant are intended for ordinary daily use which must ensure resistance to water in activities such as, for example, swimming or more simply taking a shower. Diver's watches must meet stricter standards, and according to the current standard, guarantee water resistance to a minimum depth of 100 m.

To ensure water resistance, watches are generally provided with a set of sealing gaskets positioned at the joining points of certain parts of the watch, such as the crystal, the bezel and the back cover of the watch, and movable elements such as the crown and push-buttons. With time and use, the mechanical properties of the gaskets change, and the sealing of the watch can sometimes deteriorate. The watch then becomes more permeable to water or to water vapour. The consequences may be condensation phenomena on the inner surface of the watch crystal, or worse, oxidation of certain metal components or degradation of certain polymer components. Thus, there is a need to be able to monitor the degree of relative humidity inside the watch from time to time, without necessarily having to open it, since opening the watch case systematically requires changing the gaskets and involves a watch technician, which is expensive. Indeed, an excess of water vapour inside the watch may indicate that one or more gaskets need to be replaced in the short or medium term.

To meet this need, there are known watches including a device for measuring the degree of relative humidity inside the watch. Such a measuring device takes the form of an electronic module able to measure and store values of various environmental parameters, including relative humidity. The reduced size of such an electronic module means that it can be arranged inside a watch case and measure, via a dedicated sensor, the degree of relative humidity inside the watch case. It is then possible to wirelessly transmit the measured relative humidity values to a watch docking station, typically by infrared or radiofrequency means. For example, the infrared signal emitted by the electronic module then passes through a transparent portion of the watch case, typically the crystal, and is received by an infrared sensor of the docking station. A watch user can then view the measured relative humidity values via a computer connected to the docking station and equipped with dedicated software, or a smartphone.

However, one drawback of such an electronic measuring device is that it requires a battery or cell in order to power the various electronic components. Such a device is thus very unsuitable for mechanical watches in particular. Further, for electronic watches, it may impair the autonomy of a product or require using a greater capacity battery and thus increase the volume of the watch.

Another drawback is that such a device is relatively bulky and indiscreet inside the watch. Further, such an electronic measuring device is relatively expensive and therefore impacts the manufacturing cost of the watch.

SUMMARY OF THE INVENTION

It is therefore an object of the invention to provide a watch of any type, be it mechanical, electronic or hybrid, which allows the degree of relative humidity present in the watch case to be monitored without having to open it, while being economical, simple to manufacture, and which can quickly and reliably measure the degree of relative humidity inside the watch case.

To this end, the invention concerns a watch that includes the features mentioned in the independent claim 1.

Specific embodiments of the watch are defined in the dependent claims 2 to 15.

One advantage of such a watch according to the invention lies in the use, inside the watch case, of a fibre optic measuring device for measuring the degree of relative humidity inside the watch. The measuring optical fibre includes a portion configured such that the refractive index of the portion changes in the presence of water vapour inside the watch case. Such a configuration allows the watch to be remotely interrogated without having to open it to access the relative humidity measurement, by sending light to the input of the measuring optical fibre through a portion of the watch case that lets light through and by measuring the intensity of the outgoing light. The use of an optical fibre for the measurement makes this solution a particularly simple and inexpensive solution for measuring the degree of relative humidity inside the watch case. Further, the fibre optic measuring device is a passive system which does not require an electronic circuit or power battery, and is thus compatible with any type of watch, notably with mechanical watches as well as electronic or hybrid watches. Further, the reduced dimensions of the measuring optical fibre allow it to be discreetly integrated in the watch case. Finally, the measurement made by the fibre optic device is at least as reliable and as quick as that made by electronic measuring devices of the prior art.

According to a first embodiment of the invention, said portion forms an intermediate part of the measuring optical fibre, located between the two ends of the optical fibre.

According to a second embodiment of the invention, said portion forms a free end of the optical fibre, said free end being optically configured to form a Fabry-Pérot cavity.

According to a particular technical feature of the invention, said portion of the measuring optical fibre does not have an optical sheath.

According to another particular technical feature of the invention, said portion of the measuring optical fibre includes an external layer whose refractive index changes in the presence of water vapour.

Advantageously, said external layer includes an alternate superposition of layers of polymers and of silicon dioxide nanoparticles. This makes it possible to give the external layer of the portion of the measuring optical fibre hydrophilic properties. The refractive index of the external layer thus changes in the presence of water vapour in the environment of the portion of measuring optical fibre.

Advantageously, according to the second embodiment of the invention, said portion of the measuring optical fibre has a length substantially equal to 30 mm. This makes it possible to obtain reliability detection of relative humidity inside the watch case, for relative humidity comprised between 10% and 100%.

To this end, the invention also concerns an assembly for measuring the degree of relative humidity inside a watch case, including the watch described above and a device equipped with means for determining a degree of relative humidity from a light signal and light emitting and receiving means connected to the determining means, wherein the watch case is provided with a case middle and further includes a light transmission window, the device being configured to emit and receive light through the light transmission window of the watch, and the light flows through the measuring optical fibre.

According to a preferred example embodiment of the invention, the device is a portable device.

Advantageously, the device further includes an electronic relative humidity sensor, and means of comparison between a relative humidity value determined by the electronic relative humidity sensor and a relative humidity value determined by the means for determining a degree of relative humidity from a light signal. This makes it possible to compare the relative humidity value measured inside the watch case to the ambient relative humidity value, and thus to improve the reliability of measurement. Indeed, the level of humidity inside the watch is generally in equilibrium with the level of ambient humidity. If the means for determining a degree of relative humidity indicate an internal humidity level higher than the ambient humidity level measured by the electronic sensor, this indicates that there is an excess of water vapour inside the watch case. In the event that the wearer moves from a non-humid environment to a very humid environment, for example on leaving an aeroplane in a tropical country, it may be necessary to wait for equilibrium to occur between the interior and exterior of the watch before making measurements, which might be distorted.

BRIEF DESCRIPTION OF THE DRAWINGS

The objects, advantages and features of the watch according to the invention and of the assembly for measuring the degree of relative humidity which includes the watch, will appear more clearly in the following description based on at least one non-limiting embodiment, illustrated by the drawings, in which.

DETAILED DESCRIPTION OF THE INVENTION

Figure 1:
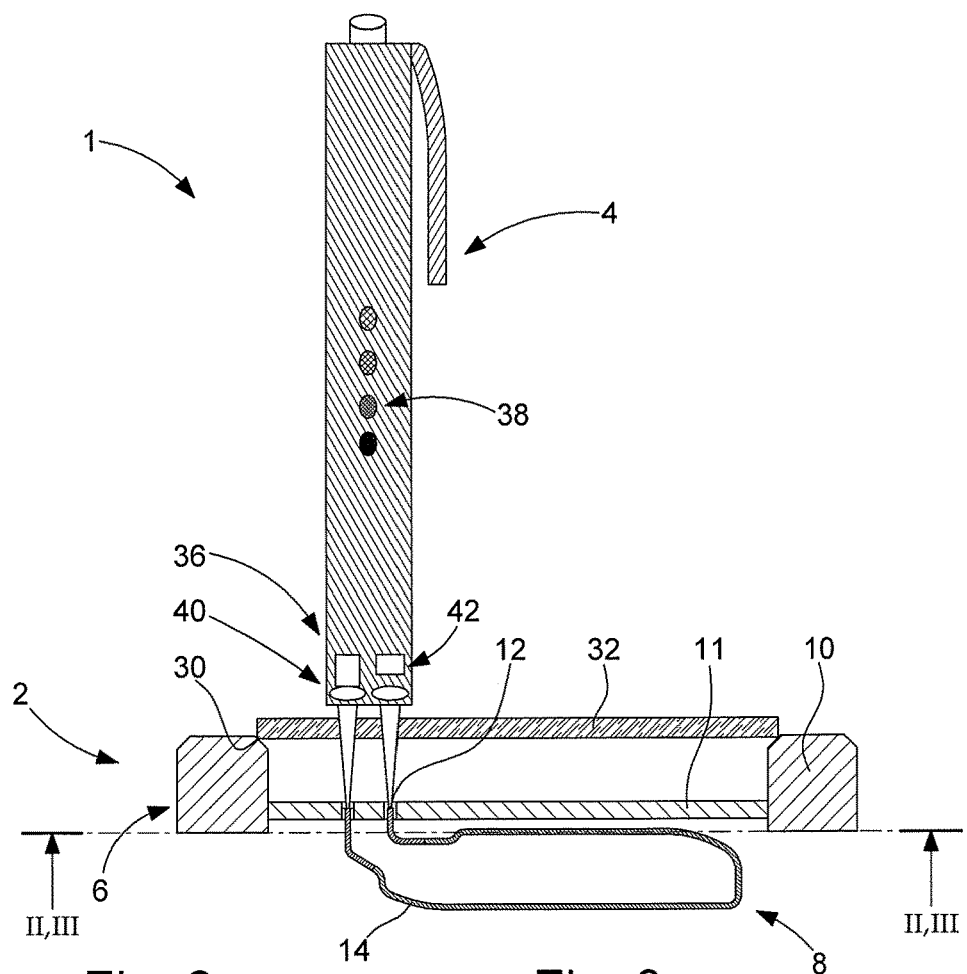
FIG. 1 is a schematic, partial sectional view of an assembly for measuring the degree of relative humidity, including a watch according to the invention, wherein the watch includes a watch case and a fibre optic measuring device for measuring the degree of relative humidity inside the watch case.

FIG. 1 represents an assembly 1 for measuring the degree of relative humidity inside a watch 2. In the present invention, the 'degree of relative humidity' means 'the ratio of partial pressure of water vapour contained in air to the saturation vapour pressure (or vapour tension) at the same temperature'. In other words, the degree of relative humidity measurement corresponds to a measurement of the ratio of the water vapour content in air to its maximum capacity to contain water vapour in the same temperature conditions.

Assembly 1 includes watch 2 and an external device 4 able to transmit a light signal to watch 2. Watch 2 may be a watch of any type, such as, for example, a mechanical watch or an electronic watch.

Figure 2:
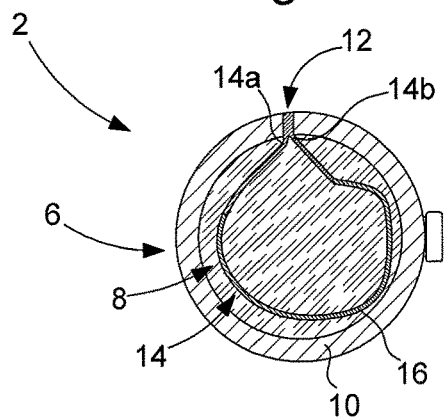
FIG. 2 is a sectional view, taken along a sectional plane II-II, of the watch of FIG. 1 according to a first embodiment of the invention.
Figure 3:
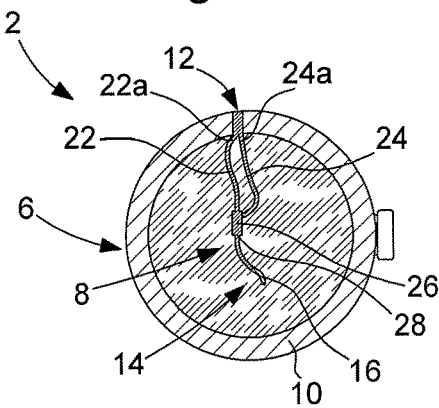
FIG. 3 is a sectional view, taken along a sectional plane III-III, of the watch of FIG. 1 according to a second embodiment of the invention.

Watch 2 is provided with a watch case 6. Watch case 6 includes a device 8 for measuring the degree of relative humidity inside watch 2. Watch case 6 also includes a case middle 10, measuring device 8 being arranged, for example, inside case middle 10, as illustrated in FIGS. 1 to 3. Preferably, watch case 6 contains a dial 11 and time display means (the latter are not represented in the Figures for the sake of clarity). Also preferably, watch case 6 is further provided with a light transmission window 12.

Figure 4:
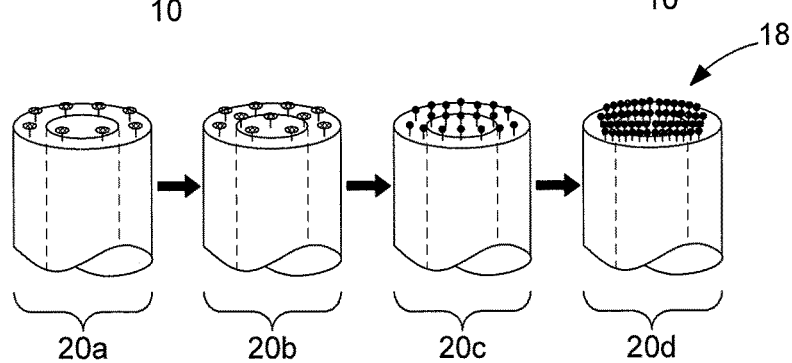
FIG. 4 is a schematic view representing the steps for treating one portion of the measuring optical fibre of the device for measuring the degree of relative humidity of FIG. 1.

Measuring device 8 is a fibre optic device including a measuring optical fibre 14. Measuring optical fibre 14 includes a portion 16 configured such that the refractive index of portion 16 changes in the presence of water vapour inside watch case 6. To achieve this, according to a particular example embodiment of the invention, this portion 16 of measuring optical fibre 14 is, for example, stripped of its optical sheath. Optical fibre portion 16 includes, in place of the optical sheath, an external layer 18 whose refractive index changes in the presence of water vapour. Preferably, external layer 18 includes, for example, an alternate superposition of layers of polymers and of silicon dioxide nanoparticles. This gives external layer 18 of optical fibre portion 16 hydrophilic properties and, in the presence of water vapour, makes it possible to obtain the aforementioned change of refractive index. A method of forming such an external layer 18 is illustrated in FIG. 4 and will now be described with reference to that Figure.

It is assumed that optical fibre portion 16 has already been stripped of its optical sheath.

In a first step 20a, the stripped optical fibre portion 16 is treated by hydroxylation, in order to activate the surface of the fibre core and prepare it for subsequent layer depositions. Hydroxylation consists, for example, in treating the surface of stripped optical fibre portion 16 with an ethanolic potassium hydroxide solution.

In a next step 20b, a first polymer layer is deposited on stripped optical fibre portion 16. The deposited polymer is typically a positively charged polymer, for example a polycation. Such a polycation is, for example, poly(allylamine hydrochloride), also called PAH. In such case, the deposition is carried out by immersing fibre portion 16 in the polymer, typically the polycation PAH.

In a next step 20c, a first layer of nanoparticles is deposited on the first polymer layer. The deposited nanoparticles are typically negatively charged nanoparticles, for example silicon dioxide nanoparticles. The deposition is carried out by immersing fibre portion 16 in a solution containing the nanoparticles.

In a final step 20*d*, deposition steps 20*b* and 20*c* are repeated in order to obtain the desired number of alternate layers.

The method is thus a layer-by-layer formation method, to obtain the alternate superposition of layers of polymers and silicon dioxide nanoparticles on optical fibre 14. It is to be noted that the successive steps 20*a* to 20*d* can be separated from each other by sub-steps of washing and drying/polymerizing the layers.

In a first embodiment of the invention, represented in FIG. 2, portion 16 forms an intermediate part of measuring optical fibre 14, located between the two ends 14*a*, 14*b* of the optical fibre. Measuring device 8 is arranged inside middle part 10 of watch case 6. The two ends 14*a*, 14*b* of measuring optical fibre 14 are arranged facing light transmission window 12, as illustrated in FIGS. 1 and 2. Preferably, in this embodiment, when external layer 18 of intermediate portion 16 has the alternate superposition of layers of polymers and of silicon dioxide nanoparticles described above, intermediate portion 16 has a length substantially equal to 30 mm. In the presence of water vapour, the refractive index of external layer 18 of portion 16 increases and the evanescent part of the light guided into optical fibre 14 penetrates further into layer 18. Consequently, the light intensity detected at the output of optical fibre 14 is modulated by the presence of water vapour around intermediate portion 16.

In a second embodiment of the invention, represented in FIG. 3, portion 16 forms a free end of the measuring optical fibre 14. This free end 16 is optically configured to form a Fabry-Pérot cavity. To achieve this, one possibility consists in the particular configuration of external layer 18 of free end 16 described above, namely the alternate superposition of layers of polymers and of silicon dioxide nanoparticles. Indeed, this multi-layer deposition behaves optically like a Fabry-Pérot cavity, whose reflectivity changes with the refractive index; the latter is in turn affected by the degree of humidity in the environment of the optical fibre. According to this second embodiment, measuring device 8 further includes a light input optical fibre 22, a light output optical fibre 24, and an optical coupler 26 coupling the light input optical fibre 22 to the light output optical fibre 24. The other end 28 of measuring optical fibre 14, opposite to free end 16, is connected to optical coupler 26. Measuring device 8 is arranged inside middle part 10 of watch case 6. The respective free ends 22*a*, 24*a* of the light input and output optical fibres 22, 24, are arranged facing light transmission window 12, as illustrated in FIG. 3. As will be detailed below, input optical fibre 22 allows light to be injected into measuring device 8, and output optical fibre 24 allows the light intensity reflected by the Fabry-Pévot cavity to be measured.

Referring again to FIG. 1, case middle 10 is, for example, annular in shape and is provided with an upper annular rim 30 on which rests a crystal 32. In the watch case 6 taken as an example in FIGS. 1 to 3, the configuration of the watch case is substantially circular. However, the invention is not limited to this watch case configuration, or to the other arrangements described above for case middle 10.

According to a first example embodiment illustrated in FIGS. 2 and 3, and which can apply to both the first and second embodiments described above, light transmission window 12 is machined in middle part 10 of watch case 6. Preferably, window 12 is then formed of a translucent, water resistant material, such as, for example, mineral glass or sapphire.

According to a second embodiment illustrated in FIG. 1, and which can apply to both the first and second embodiments described above, light transmission window 12 is machined through dial 11 of watch case 6 and is arranged facing crystal 32. In such case, window 12 is, for example, formed of an aperture made through dial 11.

External device 4 includes means for determining a degree of relative humidity from a light signal and light emitting and receiving means 36 connected to the determining means. The determining means are not represented in the Figures for the sake of clarity. Preferably, external device 4 also includes an electronic relative humidity sensor and comparison means; these elements are not represented in the Figures. The comparison means are connected to the electronic relative humidity sensor and to the means of determining a degree of relative humidity from a light signal. The comparison means are configured to compare a relative humidity value determined by the electronic relative humidity sensor and a relative humidity value determined by the means for determining a degree of relative humidity from a light signal. Also preferably, device 4 further includes display means 38, connected to the means for determining a degree of relative humidity from a light signal and/or to the comparison means.

External device 4 is configured to emit and receive light through light transmission window 12 of watch 2. According to a preferred embodiment, illustrated in FIG. 1, external device 4 is a portable device, i.e. a device that can be worn by a user without requiring a wired connection for its power supply. As represented in FIG. 1, portable device 4 has, for example, a pen shape, with the tip of the pen containing light emitting and receiving means 36.

The means for determining a degree of relative humidity from a light signal include, for example, processing means, such as an electronic chip, and memory means connected to the processing means. The memory means store, for example, one or more correspondence tables between light intensity values and the associated degree of relative humidity values.

As illustrated in FIG. 1, light emitting and receiving means 36 include, for example, a focused light source 40 able to emit light towards watch 2 through light transmission window 12, and a light sensor 42 able to receive, through window 12, the outgoing light that has passed through measuring optical fibre 14.

Display means 38 are able to display distinct visual signals as a function of the degree of relative humidity value determined by the determining means, or as a function of the result of the comparison made by the comparison means. Each visual signal displayed by display means 38 then corresponds, depending on the case, to a predetermined degree of relative humidity value, or to a predetermined differential value of relative humidity. As illustrated in FIG. 1, display means 38 are, for example, formed of a light indicator with light emitting diodes, wherein the illumination of a given diode corresponds to a predetermined relative humidity threshold. Display means 38 thus provide a visual sign to the user, indicating the degree of relative humidity inside watch 2.

The operation of assembly 1 for measuring the degree of relative humidity inside a watch 2 will now be described. Once external device 4 is positioned facing light transmission window 12 of watch 2, a user of assembly 1 activates light emitting and receiving means 36. In particular, in the illustrative example of FIG. 1, the user activates focused light source 40. This makes it possible to inject incoming light into watch case 6, notably inside measuring optical fibre 14. In the second embodiment of the invention illustrated in FIG. 3, the incoming light first flows inside input optical fibre 22. The light then flows inside measuring optical fibre 14, is reflected back by the Fabry-Pérot cavity formed by free end 16, and then moves into output optical fibre 24, by passing through optical coupler 26.

The light that has flowed through measuring optical fibre 14 is then received by light emitting and receiving means 36. In particular, in the illustrative example of FIG. 1, the outgoing light is received by light sensor 42.

Such a configuration according to the invention thus makes it possible to access the measurement of the degree of relative humidity inside the watch case without having to open it, by sending light to the input of the measuring optical fibre and by measuring the outgoing light intensity.

It will also be noted that, according to a variant that is not represented, it is possible for at least the display means of the degree of relative humidity to be integrated in the watch case, the light source may, for example be formed by the flashlight of a smartphone.

The invention claimed is:

1. A watch comprising a watch case, wherein the watch case comprises a device for measuring a degree of relative humidity inside the watch;
   wherein said device for measuring the degree of relative humidity is a fibre optic device including a measuring optical fibre, said optical fibre including a portion configured such that a refractive index of said portion changes in a presence of water vapour inside the watch case.

2. The watch according to claim 1, wherein said portion forms an intermediate part of the measuring optical fibre, located between two ends of the optical fibre.

3. The watch according to claim 1, wherein said portion forms a free end of the optical fibre, said free end being optically configured to form a Fabry-Pérot cavity.

4. The watch according to claim 3, wherein said device for measuring the degree of relative humidity further includes a light input optical fibre, a light output optical fibre, and an optical coupler coupling the light input optical fibre to the light output optical fibre; another end of the measuring optical fibre being connected to the optical coupler.

5. The watch according to claim 1, wherein said portion of the measuring optical fibre is stripped of its optical sheath.

6. The watch according to claim 5, wherein said portion of the measuring optical fibre includes an external layer whose refractive index changes in the presence of water vapour.

7. The watch according to claim 6, wherein said external layer includes an alternate superposition of layers of polymers and of silicon dioxide nanoparticles.

8. The watch according to claim 5, wherein said portion of the measuring optical fibre has a length substantially equal to 30 mm.

9. The watch according to claim 1, wherein said watch case is provided with a case middle and further includes a light transmission window.

10. The watch according to claim 9, wherein said light transmission window is machined in the case middle.

11. The watch according to claim 10, wherein said light transmission window is formed of a translucent water resistant material.

12. The watch according to claim 10, wherein said device for measuring the degree of relative humidity is arranged inside the case middle of the watch case, respective free ends of light input and output optical fibres being arranged facing the light transmission window.

13. The watch according to claim 10, wherein said device for measuring the degree of relative humidity is arranged inside the case middle of the watch case, two ends of the measuring optical fibre being arranged facing the light transmission window.

14. The watch according to claim 9, wherein said watch case contains a dial and is provided with a crystal closing the case middle; the light transmission window being machined through the dial and being arranged facing the crystal.

15. The watch according to claim 14, wherein said light transmission window is formed of an aperture made through the dial.

16. An assembly for measuring the degree of relative humidity inside a watch, comprising a watch and a device equipped with means for determining a degree of relative humidity from a light signal and light emitting and receiving means connected to the determining means, wherein said watch conforms to claim 9, the device being configured to emit and receive light through the light transmission window of the watch, the light flowing through the measuring optical fibre.

17. The assembly according to claim 16, wherein said device is a portable device.

18. The assembly according to claim 17, wherein said portable device has a pen shape.

19. The assembly according to claim 16, wherein said light emitting and receiving means include a focused light source and a light sensor.

20. The assembly according to claim 16, wherein said device further comprises an electronic relative humidity sensor, and means of comparison between a relative humidity value determined by the electronic relative humidity sensor and a relative humidity value determined with a degree of relative humidity from a light signal.

21. The assembly according to claim 20, wherein said device further includes display means able to display several distinct visual signals as a function of a result of the comparison, each visual signal corresponding to a predetermined differential value of relative humidity.

* * * * *